(12) United States Patent
Willen

(10) Patent No.: US 7,769,553 B2
(45) Date of Patent: Aug. 3, 2010

(54) METHOD FOR COMPENSATING ELECTROMAGNETIC DATA

(75) Inventor: Dennis E. Willen, Houston, TX (US)

(73) Assignee: Exxon Upstream Research Co., Houston, TX (US)

( * ) Notice: Subject to any disclaimer, the term of this patent is extended or adjusted under 35 U.S.C. 154(b) by 119 days.

(21) Appl. No.: 12/087,438

(22) PCT Filed: Dec. 4, 2006

(86) PCT No.: PCT/US2006/046329

§ 371 (c)(1),
(2), (4) Date: Jul. 2, 2008

(87) PCT Pub. No.: WO2007/092070

PCT Pub. Date: Aug. 16, 2007

(65) Prior Publication Data

US 2009/0067546 A1    Mar. 12, 2009

Related U.S. Application Data

(60) Provisional application No. 60/771,236, filed on Feb. 8, 2006.

(51) Int. Cl.
   *G01R 23/00* (2006.01)
(52) U.S. Cl. ..................................... 702/75
(58) Field of Classification Search ............ 702/2, 702/6, 7, 9, 11–14, 17, 18, 57–59, 65, 69, 702/75, 76, 79, 89, 106, 176, 182, 183; 324/365; 367/13, 15, 38, 73
See application file for complete search history.

(56) References Cited

U.S. PATENT DOCUMENTS

| 4,107,598 | A | * | 8/1978 | Meador et al. ............... 324/341 |
| 4,617,518 | A | | 10/1986 | Srnka ......................... 324/365 |
| 4,695,984 | A | | 9/1987 | Paal ............................ 367/54 |
| 5,001,675 | A | | 3/1991 | Woodward .................... 367/13 |
| 5,384,752 | A | | 1/1995 | Duren et al. ................... 367/38 |
| 5,408,441 | A | | 4/1995 | Barr et al. ..................... 367/15 |

(Continued)

FOREIGN PATENT DOCUMENTS

| GB | 2 412 740 | 10/2005 |
| WO | WO 2005/117540 | 12/2005 |

OTHER PUBLICATIONS

Chave, A. D. et al (1987) "Electrical Exploration Methods for the Seafloor," *Electromagnetic Methods in Applied Geophysics*, Part B, Soc. of Expl. Geo., p. 949.

(Continued)

*Primary Examiner*—Mohamed Charioui

(57) ABSTRACT

Method for compensating for phase errors in electromagnetic data by exploiting the frequency scaling properties of electromagnetic fields. The data are obtained at various source-receiver offsets. Then, temporal frequency components of the data at each offset R are determined. Next, the phase spectrum (phase vs. offset) for each of the frequency components is determined. Then, the phase spectra for the different frequencies f are displayed vs. scaled offset $R\sqrt{\omega}$, where $\omega=2\pi f$. Finally, the phase spectra are then adjusted such that the differences in phases for the different frequencies are reduced. The adjustment process can be repeated until phase differences are reduced to an acceptable level.

17 Claims, 4 Drawing Sheets

U.S. PATENT DOCUMENTS

| | | | |
|---|---|---|---|
| 5,555,218 A | 9/1996 | Chambers et al. | 367/73 |
| 5,764,516 A | 6/1998 | Thompson et al. | 702/17 |
| 6,757,616 B1 | 6/2004 | Emmons et al. | 702/18 |
| 2005/0251340 A1 | 11/2005 | Tompkins | 702/2 |

OTHER PUBLICATIONS

Constable, S. C. et al. (1998) "Marine Magnetotellurics for Petroleum Exploration Part 1: A Sea-Floor Equipment System," *Geophysics*, v. 63, pp. 816-825.

Eidesmo, T. et al., (2002) "Sea Bed Logging (SBL), A New Method for Remote and Direct Identification of Hydrocarbon Filled Layers in Deepwater Areas", *First Break, European Association of Geoscientists and Engineers*, Houten, NL, vol. 20, pp. 144-152.

Ellingsrud, S. et al. (2002) "Remote Sensing of Hydrocarbon Layers by Seabed Logging (SBL): Results From a Cruise Offshore Angola," *The Leading Edge*, v. 21, pp. 972-982.

Jackson, J. D. (1975) *Classical Electrodynamics*, John Wiley & Sons, $2^{nd}$ edition, pp. 84, 104-105.

MacGregor, L. M. et al. (1998) "The RAMESSES Experiment—III. Controlled-Source Electromagnetic Sounding of the Reykjanes Ridge at 57° 45' N," *Geophys. J. Int.*, v.135, pp. 773-789.

Smith, B. D. et al. (1974) "On the Computation of Polarization Ellipse Parameters", *Geophysics*, v. 39, pp. 867-869.

Taner, M. et al. (1981) "Surface Consistent Corrections," *Geophysics*, v. 46, pp. 17-22.

Ward, S. H. et al. (1987) "Electromagnetic Theory for Geophysical Applications," *Electromagnetic Methods in Applied Geophysics*, v.1, Soc. Exp. Geoph. pp. 229-231.

Research Disclosure #523018 (2007) "Method of Marine CSEM Surveying With Stationary Sources," 8 pp. 1104-1111.

*European Search Report*, (2006), RS 113621, Jul. 21, 2006, 2 pages.

*International Search Report*, (2008), PCT/US2006/046329, Sep. 9, 2008, 1 page.

\* cited by examiner

METHOD FOR COMPENSATING ELECTROMAGNETIC DATA

This application is the National Stage entry under 35 U.S.C. 371 of PCT/US2006/046329 that published as WO 2007/092070 and was filed on Dec. 4, 2006 and claims the benefit of now expired U.S. Provisional Application 60/771,236, filed 8 Feb. 2006.

FIELD OF THE INVENTION

The present invention relates generally to the field of geophysical prospecting and, more particularly to controlled-source electromagnetic prospecting. Specifically, the invention is a method and apparatus for compensating electromagnetic data, and even more particularly but not exclusively, the invention relates to a method and apparatus for deriving and applying corrections to electromagnetic data for phase errors.

BACKGROUND OF THE INVENTION

Controlled-source electromagnetic ("CSEM") surveys are an important geophysical tool for evaluating the presence of hydrocarbon-bearing strata within the earth. CSEM surveys typically record the electromagnetic signal induced in the earth by a source (transmitter) and measured at one or more receivers. The behavior of this signal as a function of transmitter location, frequency, and separation (offset) between transmitter and receiver can be diagnostic of rock properties associated with the presence or absence of hydrocarbons. Specifically, CSEM measurements are used to determine the spatially varying resistivity of the subsurface. A resistivity anomaly may indicate the presence of hydrocarbons in the layer exhibiting the anomaly.

In the marine environment, CSEM data are typically acquired by towing an electric dipole transmitter antenna among a number of receivers positioned on the seafloor. The receivers have multiple sensors designed to record different vector components of the electric and/or magnetic fields. Alternative configurations include stationary transmitters on the seafloor or in the water column as well as magnetic transmitter antennae. The transmitting and receiving systems typically operate independently (without any connection), so that receiver data must be synchronized with shipboard measurements of transmitter position by comparing clock times on the receivers to time from a shipboard or GPS (Global Positioning System) standard.

CSEM data are typically interpreted in the temporal frequency domain, each signal representing the response of the earth to electromagnetic energy at that temporal frequency. In raw data, the strength of each frequency component varies depending on how much energy the transmitter broadcasts and on the receiver sensitivity at that frequency. These effects are typically removed from the data prior to interpretation.

Both the phase and amplitude must be accurately determined in order to distinguish signal characteristics associated with hydrocarbons from the much larger portion of the signal that is associated to other geologic features of the subsurface.

In many examples of CSEM hardware, data cannot be effectively recorded at the nearest offsets because the dynamic range of the receiver's digitizers is too small to accurately represent the signal. This region is sometimes known as the "saturation zone" and typically encompasses source-receiver offsets of less than 500 meters.

While the phase of CSEM data can provide valuable constraints on the present or absence of hydrocarbons, in practice, phase can be difficult to measure accurately:

transmitter and receiver signals are recorded separately using different time bases (clocks) that must themselves be synchronized against a common GPS time base;

the transmitter current waveform must be accurately measured and reported from several hundreds or thousands of meters below the surface;

the responses of the receiver amplifiers must by accurately known at the frequencies where data are measured;

the receiver antennae (particularly the magnetic antennae) generally have a frequency-dependent response. Moreover, the response of the combined antennae-amplifier circuit can differ from the combined responses of the components;

small changes in the earth's resistivity close to the receiver may alter the electric and magnetic field values; and, the chemical interaction of the transmitting antenna electrodes with the conductive and corroding seawater is not completely understood.

Similar difficulties arise on land, although it is easier to connect both source and receivers to a common time reference. On land, phase errors occur due to localized earth inhomogeneities and, also, the problems relating to the antenna electrodes remain. The invention as disclosed herein may thus be applied to both onshore and offshore applications.

To date, phase errors have been reduced by employing high-precision and temperature-compensated clocks in the seafloor receivers. Direct measurement of the drift (time error) of these clocks relative to a time reference (such as GPS) at the start and end of the survey allows the user to stretch or compress measured data to an estimate of the reference time (S. C. Constable et al, Marine magnetotellurics for petroleum exploration Part 1: A sea-floor equipment system, *Geophysics* 63, 816-825 (1998)).

Also, independent receivers have been mounted to the transmitter to monitor the transmitter current that is actually injected into the water (L. M. MacGregor et al, The RAMESSES experiment—III. Controlled—source electromagnetic sounding of the Reykjanes Ridge at 57° 45' N, *Geophys. J. Int.* 135, 773-789 (1998)). As before, the receiver data are corrected for the measured transmitter behavior.

Finally, laboratory measurements of the response of the receiver's amplifier-antenna system have been used to compensate field CSEM data (S. Ellingsrud, et al, Remote sensing of hydrocarbon layers by seabed logging (SBL): Results from a cruise offshore Angola, *The Leading Edge* 21, 972-982 (2002)).

The above methods still fail to adequately remove residual phase errors caused by clock drift, transmitter variations, and receiver calibrations. Another disadvantage associated with the methods known to date is that the combination of hardware and software needed to monitor the injected transmitter current is both costly and subject to breakdown as it must make real-time measurements while being dragged through the deep ocean.

The present invention aims to obviate or at least mitigate the above described problems and/or to provide advantages generally.

SUMMARY OF THE INVENTION

According to the invention there is provided a method and an apparatus as defined in any of the accompanying claims.

In an embodiment, there is provided a method of compensating electromagnetic data signals recorded by a receiver in a controlled source electromagnetic survey for a phase error, comprising:

(a) obtaining electromagnetic data signals at a plurality of source-receiver offsets, R;

(b) determining a plurality of temporal frequency components of the data at each of said source-receiver offsets;

(c) determining the phase spectra of each of said frequency components;

(d) scaling the source-receiver offset R of said phase spectra for each frequency f by a scale factor proportional to $\sqrt{\omega}$ where $\omega=2\pi f$, and;

(e) adjusting said phase spectra such that the differences in phases for said frequencies are substantially minimized over at least a portion of the scaled offset range.

In this way phase errors in electromagnetic data such as data from CSEM surveys are eliminated, reduced or minimized by exploiting the frequency-scaling properties of the electromagnetic fields. These scaling behaviors are exact for a subsurface that is layered and approximately true for more general, 3-D resistivity variations in the subsurface. The phase errors may be caused by timing errors in the CSEM surveys and in particular in the CSEM survey system. These timing errors may be associated with the receiver and/or with the transmitter. The sum of these timing errors is the phase error.

The differences in phases for the frequencies are reduced such that these differences are minimal or as small as possible. In some cases, the differences in phases may be so small that the differences in phases are eliminated.

In an embodiment of the invention, the electromagnetic data may comprise magnetic and/or electric field data.

The receiver or multiple receivers are preferably stationary whereas the source is moved in relation to the receivers. The receivers may be located on land or on the seabed as the method of the invention is suited to both land and subsea applications.

In a further embodiment of the invention, step (b) of the method is performed by dividing time-domain electromagnetic data into specific time intervals, each time interval approximately corresponding to a specific value of R, and the frequency components are determined for each time interval.

In another embodiment of the invention, the recorded data are represented by their average phase spectrum during each of a plurality of time intervals. Such phase spectra can be obtained by known methods based on Fourier Transform.

In a further embodiment of the invention, for each time interval a relative source position or $R_n$ is recorded where n corresponds to a particular time interval. The source position depends on the velocity of the source and the route taken by the source through the ocean.

In a preferred embodiment of the invention, step (e) comprises selecting a timing error $\Delta T$ and multiplying the phase spectrum by $e^{-i\omega\Delta T}$. The selected timing error may be calculated by minimizing the difference between the phases at least two frequencies.

In an embodiment, the source is towed and the offset distance between the source and the receiver is measured along the tow line of the source. In particular, the phase errors determined by steps (d) to (e) of the invention may be applied to other receivers on the same tow line and the determined errors may be applied to data which were not subjected to steps (d) to (e) to calculate the phase error.

Once a phase shift or timing error has been determined for a particular set of data, in a further advantageous embodiment of the invention, this shift or error is applied to other electromagnetic data signals which were not subjected to the method of the invention to correct or compensate these signals. To elaborate, the phase adjustments (shifts) determined in step (e) above may be used to compensate any data from the survey for phase errors, whether or not the data (i) were used to determine the phase adjustments, or (ii) correspond to a frequency used to determine the phase adjustments, or (iii) represent the same vector electromagnetic field component or components used to determine the phase adjustments; or (iv) correspond to the same scaled offset range used to determine the phase adjustments.

In a further embodiment, once the phase shift has been determined for a particular set of data signals for which the differences in phases are minimized, the phase shift is converted to a timing error or time shift. This timing error may be used to compensate alternative electromagnetic data signals.

The invention may be practiced together with other techniques used to increase the reliability of the data phase, such as compensating receiver clocks for drift, adjusting for transmitter variations, applying receiver calibrations, and applying a correction based on synthetic data. Steps (d) to (e) of the invention may be conducted offline, once all receiver data have been collected.

In a preferred embodiment, the phase errors are determined separately for different vector components of the data such as the electric field data for $E_x$, $E_y$ and $E_z$ and/or the magnetic field data $B_x$, $B_y$ and $B_z$. The phase errors determined from one vector data component may be applied to other vector components. Although this may be less accurate, this results in a great reduction of required data processing.

The present invention may be practiced so long as the transmitter continues to operate correctly, even if a monitoring system has failed. For certain applications it may be desirable to convert the receiver data of the receiver for the multiple frequencies to temporal frequency data by calculating the phase spectrum without dividing the data into time intervals equal to the source signal period for each frequency (commonly referred to as "binning" or "time binning").

In addition to techniques intended to determine the temporal phase of the data, the present invention may be practiced together with other signal processing methods, such as filtering and noise suppression, intended to improve the fidelity or signal-to-noise ratio of the data.

In another embodiment of the invention, there is provided a computer implemented method for compensating electromagnetic data as hereinbefore described. In a particular embodiment, there is provided a program suitable for implementation on a computer adapted to perform one or more steps of the method as hereinbefore described. The program may be adapted to perform one or more of steps (b), (c), (d) and (e) of the method.

In a further embodiment of the invention, there is provided an apparatus for compensating electromagnetic data signals recorded by a receiver in a controlled source electromagnetic survey for a phase error, the apparatus being adapted to perform one or more steps of the method as hereinbefore described.

The apparatus may comprise: (a) a receiver and a source; (b) a recorder for recording electromagnetic data signals at a plurality of source-receiver offsets, R; (c) a computer adapted to perform the steps of:

determining a plurality of temporal frequency components for the recorded data at each of said source-receiver offsets;

determining the phase spectra of each of said frequency components;

scaling the source-receiver offset R of said phase spectra for each frequency f by a scale factor proportional to $\sqrt{\omega}$, where $\omega=2\pi f$, and;

adjusting said phase spectra such that the differences in phases for said frequencies are minimized over at least a portion of the scaled offset range.

BRIEF DESCRIPTION OF THE DRAWINGS

Specific embodiments of the invention will now be described by way of example only and with reference to the accompanying drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE INVENTION

The present invention compensates phase errors in electromagnetic data by exploiting the frequency scaling properties of electromagnetic fields. These scaling behaviors are exact for a subsurface that is layered and approximately true for more general, 3-D resistivity variations in the subsurface.

The method of compensating geophysical data comprises obtaining electromagnetic data corresponding to at least one source and one receiver location, the receiver being spaced from the source by a distance R, converting the receiver data for said frequencies to temporal frequency data by dividing the data into time intervals equal to the source signal period and calculating the phase spectrum for each time interval and each frequency.

Figure 6:
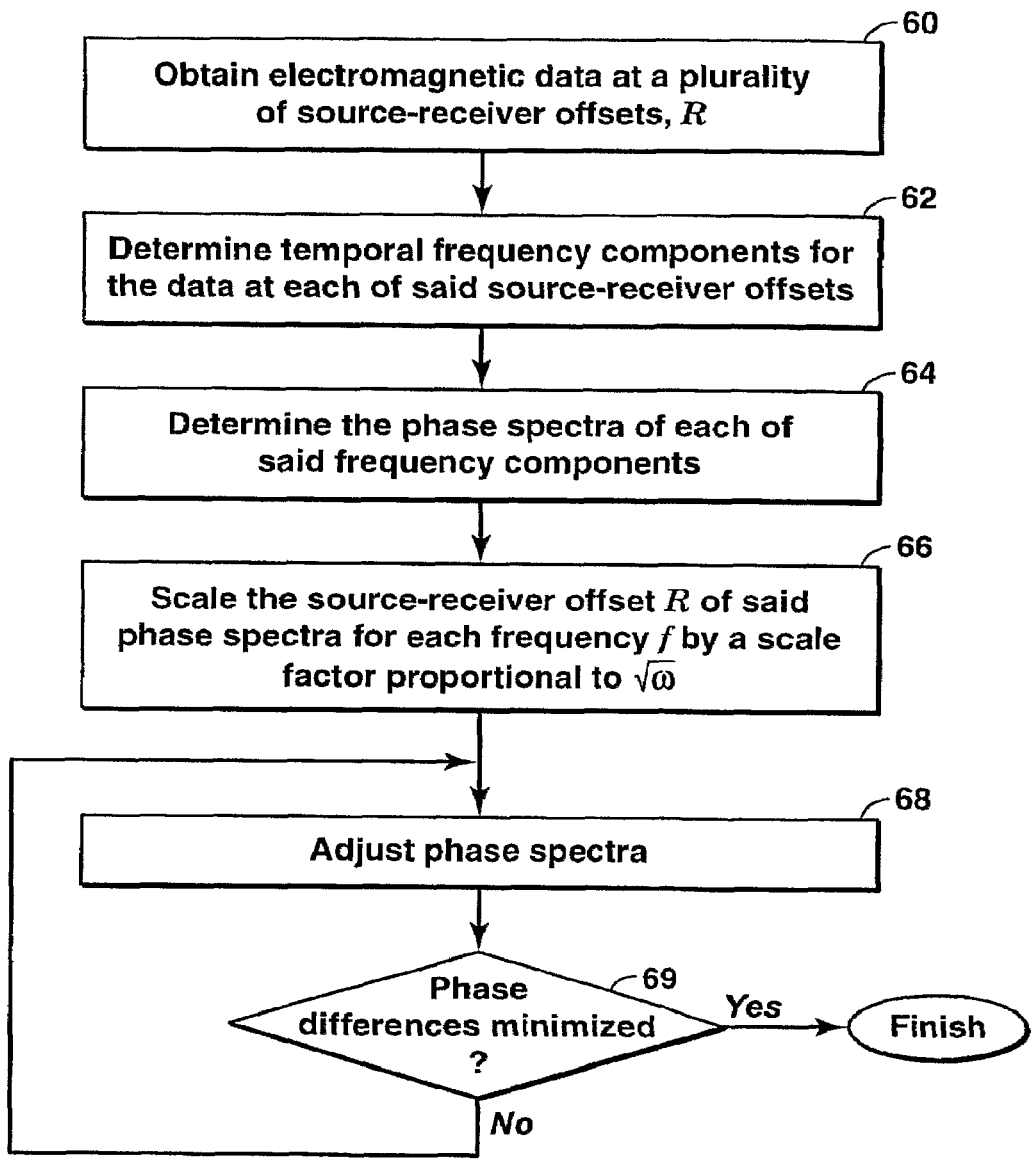
FIG. 6 shows a diagrammatic flow diagram of one embodiment of the present inventive method of compensating phase errors.

FIG. 6 is a flow chart showing basic steps in one embodiment of the present inventive method of compensating the electromagnetic data signals. The method comprises the steps of obtaining said electromagnetic data signals at a plurality of source-receiver offsets, R (step 60), determining the temporal frequency components (or selected components) for the data at each of said source-receiver offsets (62), and determining the phase spectrum of each of said frequency components (64). At step 66, the source-receiver offset R of the phase spectra are then scaled for each frequency f by a scale factor proportional to $\sqrt{\omega}$, where $\omega = 2\pi f$. Finally, at step 68, the phase spectra are adjusted such that the differences in phases for the different frequencies (when viewed together vs. scaled offset) are reduced. At step 69, the adjustment process is repeated until the phase differences are not further reduced (within a predetermined tolerance), the phase differences then being considered satisfactorily or substantially minimized and the process is terminated.

As is illustrated in FIGS. 1 to 4, the offset is scaled for each frequency to be $R\sqrt{\omega}$, and the phase spectrum is adjusted such that the differences in phases for said frequencies are minimized. The adjusted phase spectrum may then be used to analyze electromagnetic properties of the earth whereby any phase errors due to differences in phases for the various frequencies are removed or minimized.

To eliminate or at least minimize the phase error, the phase of the received electromagnetic data for the multiple frequencies is plotted versus $R\sqrt{\omega}$, where $\omega$ is the angular frequency, and the phases for each frequency are adjusted until the phases are approximately coincident at small values of the scaled offset.

The phases are approximately coincident when the timing error is within 0.005-0.010 seconds, corresponding to a 3 or 4-degree phase error at 1 or 2 Hz. Depending on the data quality and subsurface conditions, the lowest frequencies do not always satisfy the assumptions in the range of offsets that we use. These lower frequencies are generally lower than 1 Hz, more precisely lower than 0.5 Hz, and even more precisely lower than 0.125 Hz. However, as the timing error is adjusted, for increased frequencies, the timing error corresponds to reduced phase errors. Typically, the values for $R\sqrt{\omega}$ are between approximately 0.5 and 10 and particularly, 1 and 4, where R is measured in kilometers.

In an alternative embodiment of the invention, the phase errors in the electromagnetic data are assumed to stem from a timing error, $\Delta T$. Any error in the transmitter or receiver measurements that is equivalent to a timing error will have multiplied the data by $e^{+i\omega\Delta T}$, spoiling the alignment of the various phases for small values of $R\sqrt{\omega}$. The obtained electromagnetic data at more than one frequency, are again plotted versus $R\sqrt{\omega}$, where R is again the horizontal offset between transmitter and receiver and $\omega$ is the angular frequency, and the data are multiplied by $e^{-i\omega\Delta T}$ where the timing error $\Delta T$ is selected such that the phases are coincident for small $R\sqrt{\omega}$.

Figure 1A:
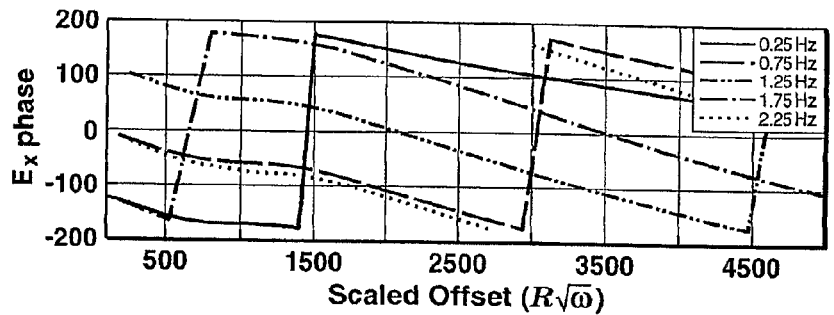
FIGS. 1A-B show horizontal electric field data synthesized from a two-layer resistivity model of the earth.
Figure 1B:
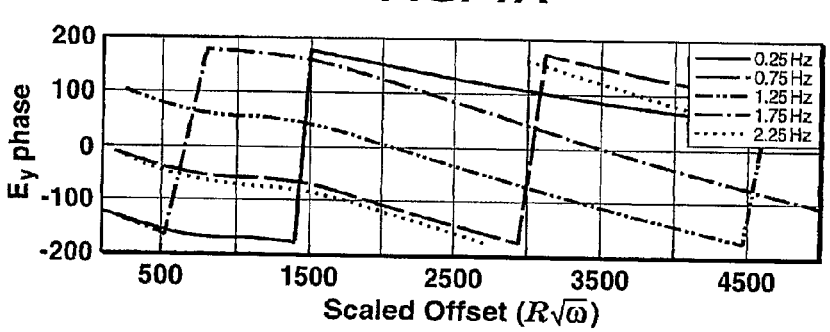

FIGS. 1A-B illustrate an example to demonstrate the impact of timing errors on electromagnetic data. These drawings show phase data from a synthetic CSEM common receiver gathered at five different frequencies: 0.25 Hz (dark solid line); 0.75 Hz (light solid line); 1.25 Hz (dark dashed line); 1.75 Hz (light dashed line); and 2.25 Hz (dotted line). The phases of both horizontal vector components of the electric field ($E_x$ in FIG. 1A and $E_y$ in FIG. 1B) are shown versus scaled offset $R\sqrt{\omega}$, where R is the distance between the source and the receiver. As is evident from these drawings, the curves do not overlie or coincide at near offsets, which indicates errors in the phase.

Figure 2A:
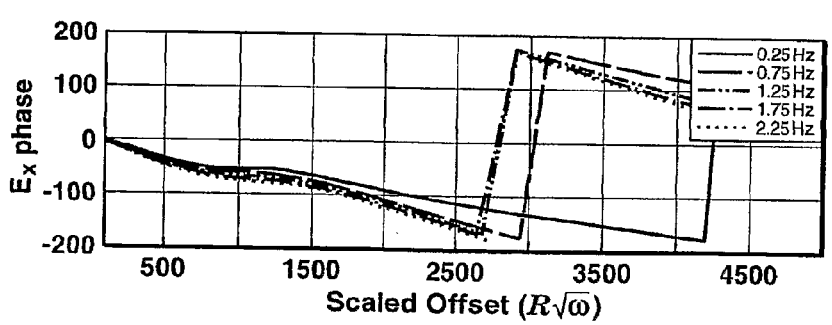
FIGS. 2A-B show the data of FIGS. 1A-B after applying a timing correction.
Figure 2B:
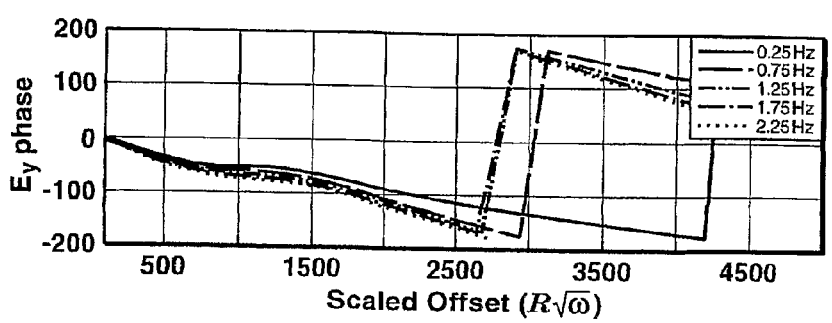

FIGS. 2A-B show the same data after applying a timing correction of +1.33 seconds. As functions of $R\sqrt{\omega}$, the phases for all frequencies become nearly equal as $R\sqrt{\omega}$ becomes small. Moreover, this approximate equality holds separately for each of the two vector components of the data. The phases on both horizontal channels are clearly consistent at small offsets when plotted versus scaled offset, indicating that the applied time shift has corrected the timing error in FIGS. 1A-B. The higher frequencies deviate less from perfect scaling than the lowest frequencies (0.25 and 0.75 Hz). The corrected data approach zero phase at $R\sqrt{\omega} \approx 0$ because, in this example, the transmitter passes within a few meters of the receiver. As a result, there is little observable propagational delay between the transmitter and receiver. Finally, the lowest frequencies are the first to deviate from the other curves as $R\sqrt{\omega}$ increases. That behavior is to be expected. Since lower frequencies correspond to the largest skin depths, their data are the most sensitive to distances in the earth model other than R.

Figure 3A:
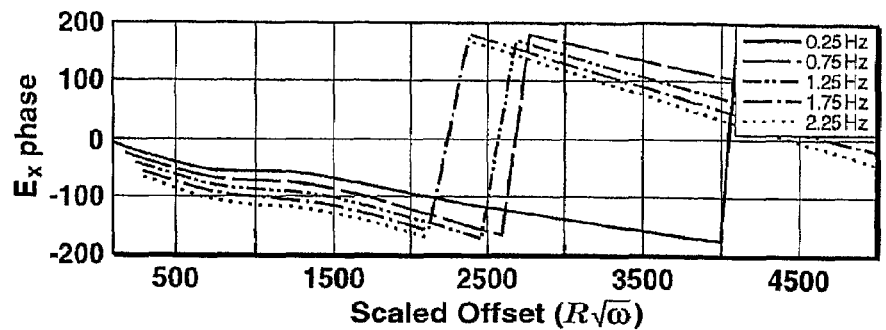
FIGS. 3A-B show the data of FIGS. 1A-B after applying an incorrect timing correction.
Figure 3B:
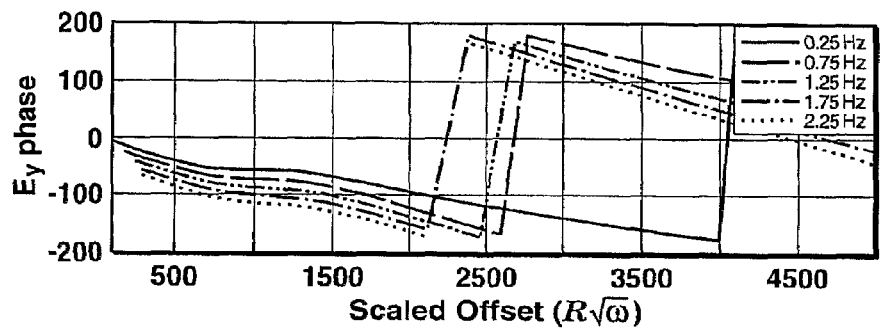

FIGS. 3A-B show the result of incorrectly estimating the timing error as +1.28 seconds in the data of FIGS. 1A-B.

While some frequencies are similar to others at small $R\sqrt{\omega}$, the timing correction is clearly much less accurate than the correction in FIGS. 2A-B.

Figure 4A:
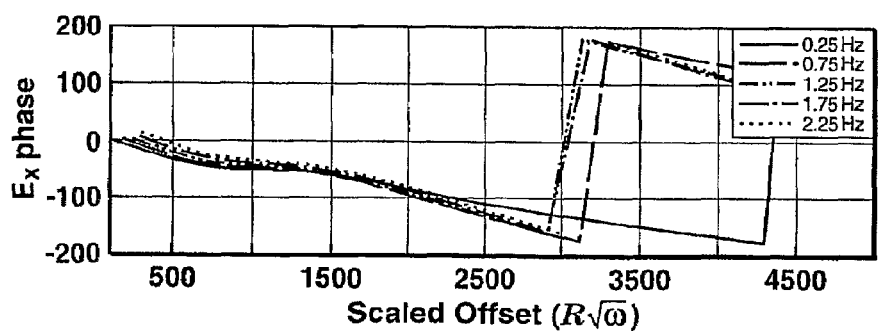
FIGS. 4A-B show the data of FIGS. 1A-B after applying a further incorrect timing correction.
Figure 4B:
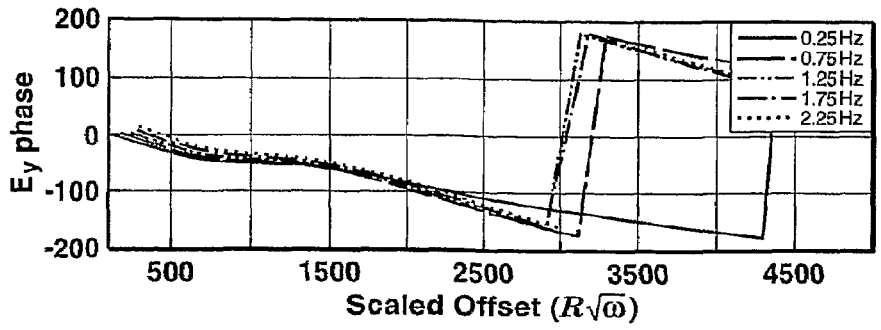

FIGS. 4A-B further demonstrate the sensitivity of the method. Although the timing correction shown in these drawings also differs from the true value by only +50 milliseconds, the phase inconsistency among frequencies is clear: while some pairs of frequencies are in approximate alignment at near offsets, all frequencies are not uniformly aligned at small offsets.

More generally, the phase can be considered as a function of $R\sqrt{\omega}$ or of $x\sqrt{\omega}$ and $y\sqrt{\omega}$ where x and y are the planar Cartesian coordinates of the source relative to the receiver measured along the source tow line (inline offset=x) and perpendicular to the tow line (crossline offset=y). When the tow line passes directly over the receiver, y is equal to zero and $x\sqrt{\omega}=R\sqrt{\omega}$. In FIGS. 1A-B to 4A-B, the tow line passed directly over the receiver and y=0.

However, when the source passes some distance away from the receiver, there are two possibilities. If phase errors can be determined from a second receiver or receivers lying beneath the tow line, then the portion of those phase errors associated with the tow line can be applied to the data from that tow line and the first receiver. If there are no receivers beneath the tow line, then the present invention may be approximately practiced by plotting the phases versus $\sqrt{x^2+y^2}\sqrt{\omega}$ (FIGS. 5 A-D). While this approximate form of the scaling will become increasingly inaccurate as the crossline offset grows, it may still allow invalid phases or time shifts to be identified and adjusted to the correct phase.

Figure 5A:
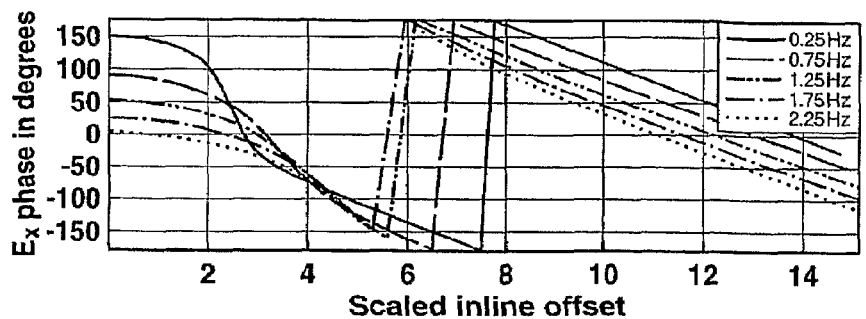
FIGS. 5A-D show in-line electric field data and scaled data.
Figure 5B:
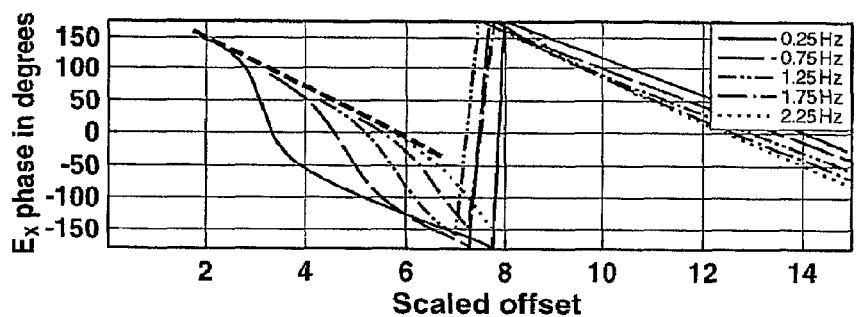

In FIGS. 5A-D, the source passes 1.5 km from the receiver at its closest approach. As is evident from FIG. 5A, the data are not well correlated versus the scaled inline offset, $x\sqrt{\omega}$. However, the dashed line in FIG. 5B shows a clear trend when the data are plotted versus the total scaled offset $\sqrt{x^2+y^2}\sqrt{\omega}$.

Figure 5C:
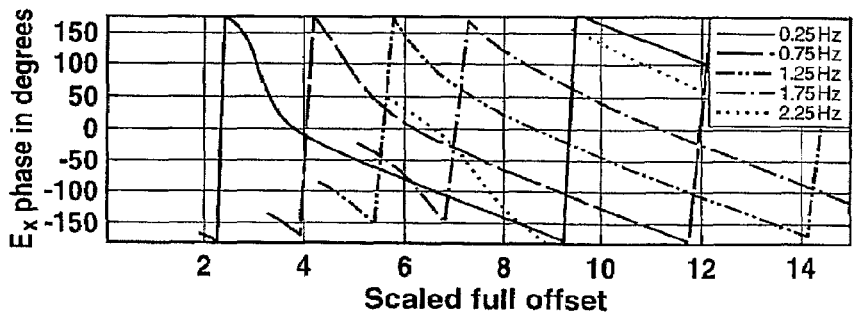
Figure 5D:
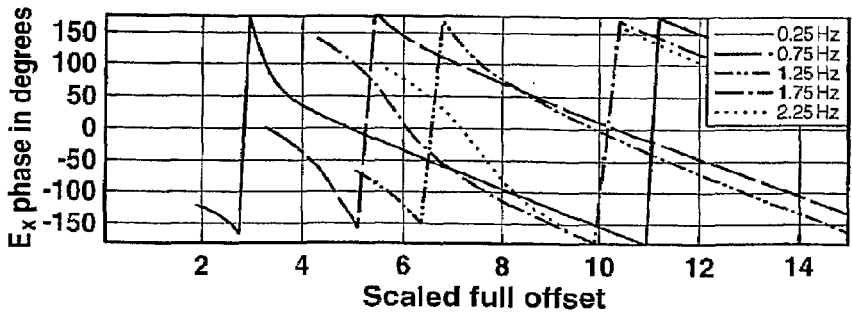

FIGS. 5C and 5D show the phases from FIG. 5B versus the total scaled offset $\sqrt{x^2+y^2}\sqrt{\omega}$ for two different timing errors: 0.5 s (FIG. 5C) and 1.0 s (FIG. 5D). The timing errors have completely disrupted the weak correlation shown in FIG. 5B.

In practice, ambiguous situations can arise for exceptional combinations of timing errors and frequencies. However these situations will be easily recognizable from the scaled data. For example, a transmitted square wave contains the frequencies 1/T, 3/T, 5/T, etc. where T is the waveform period. If T=4 seconds, then a timing error of ΔT=2 seconds will result in phase shifts of exactly 180° for every frequency. In this situation, the data phases will approximately scale for small values of $R\sqrt{\omega}$, although the phases will converge near 180°—indicating the presence of the timing error. Also, phase shifts of 180° (or −1) are equivalent to 180° changes in the orientation of the horizontal receiver antennae or to polarity errors in the wiring of the transmitter antenna. Experience has shown that it is sometimes necessary to compare phase corrections for multiple tow lines over the same receiver in order to unambiguously separate the effects of receiver orientation or transmitter antenna polarity from the phase error.

Although the above described methods are usable, preferably, the determination of the timing error is carried out without plotting of the data to determine the phase error. In accordance with this embodiment, the timing error is determined by a least-squares fit of the phases at different frequencies.

The fit is conducted for small offsets outside the saturation zone. In the real world, this translates to data from offsets in the range of 0.5-2.0 km, in both positive and negative offset direction. However, in some cases, the data will agree with the scaling relationships for typically 5 km or more depending on the subsurface conditions.

Preferably, scaling is conducted for frequencies which are relatively low but not too low, typically frequencies are selected in the range of 1.0 to 3.0 Hz.

Optionally, corrections determined by the method of the present invention may be applied to controlled-source electromagnetic data that were not directly used to determine those corrections. In a particularly simple case, a timing correction based on data at frequencies of 1.25, 1.75, and 2.25 Hz might be applied to data at all the frequencies of interest to the geophysical data analyst. In another simple case, data from several receivers along a tow line might indicate a consistent timing error but one particular receiver along that tow line indicates a notably distinct timing error. Faced with this situation, the geophysical data analyst might suspect that the timing error found for the anomalous receiver is the sum of a timing error associated with the receiver itself and a timing error associated with the source during the period of that particular tow line. The analyst might furthermore choose to extract that portion of the sum associated with the receiver and apply it to other common-receiver gathers from other tow lines in the vicinity of that receiver. By identifying anomalous behavior on one receiver among several tow lines, the analyst might further determine that the receiver's clock is running either slow or fast and chose to model the receiver-dependent timing error as a function of the time at which the tow line is required.

The notion of decomposing errors or corrections into a tow-line component and a receiver component ("surface-consistent errors") by a least-squares method is familiar to geophysical data analysts. See, for example, M. Taner and F. Koehler, "Surface consistent corrections," *Geophysics* 46, 17-22 (1981). In this technique, each surface-consistent phase error is the sum of a phase error associated with the transmitter and a phase error associated with the receiver. Either or both errors could furthermore be modeled as varying linearly with time.

In this way, electromagnetic data are corrected for phase errors. We mention here that conventional seismic methods are not directly applicable to electromagnetic data from CSEM surveys. At their core, all seismic methods estimate phase or timing errors from differences in arrival times or amplitudes of distinct seismic pulses. Distinctly arriving pulses do not generally appear in CSEM data, which are acquired at much lower frequencies and longer wavelengths than seismic data. The present invention compares data phases at different temporal frequencies. It does not compare data at different times or compare data by amplitude.

The foregoing application is directed to particular embodiments of the present invention for the purpose of illustrating it. It will be apparent, however, to one skilled in the art, that many modifications and variations to the embodiments described herein are possible. For example, the invention is described in terms of marine CSEM survey data, but the method can be applied to data collected on land or using airborne technique. The present inventive method is preferably performed at least partly on a computer, i.e., computer-implemented embodiments of the present inventive method are preferred, but not essential. All such modifications and variations are intended to be within the scope of the present invention, as defined in the appended claims.

The invention claimed is:

1. A method of compensating electromagnetic data signals recorded by a receiver in a controlled source electromagnetic survey for phase errors, comprising:

(a) obtaining said electromagnetic data signals at a plurality of source-receiver offsets, R;
(b) determining a plurality of temporal frequency components of the data at each of said source-receiver offsets;
(c) determining the phase spectra of each of said frequency components;
(d) scaling the source-receiver offset R of said phase spectra for each frequency f by a scale factor proportional to $\sqrt{\omega}$, where $\omega=2\pi f$, and;
(e) adjusting said phase spectra such that the differences in phases for said frequencies are minimized over at least a portion of the scaled offset range;
wherein one or more of steps (b), (c), (d) and (e) are performed on a computer.

2. The method of claim 1, wherein step (e) comprises multiplying a phase spectrum by $e^{-i\omega\Delta T}$, wherein the timing error $\Delta T$ is selected such that the differences in phases for at least two frequencies are minimized.

3. The method of claim 2, wherein the timing error is calculated from the differences in the phase spectrum for said frequencies.

4. The method of claim 3, wherein the timing error is calculated by a least squares fit of the different frequencies.

5. The method of claim 2, further comprising comparing timing errors for a plurality of tow lines each passing over a same receiver in order to separate effects of receiver orientation or transmitter antenna polarity from true timing error.

6. The method of claim 2, wherein the phase spectra are adjusted for timing errors outside a receiver saturation zone.

7. The method of claim 1, wherein the temporal frequency components determined in step (b) correspond to selected frequencies within the range 0.01 Hz to 10 Hz.

8. The method of claim 7, wherein the selected frequencies are in the range from 1 to 3 Hz.

9. The method of claim 1, further comprising the steps of:
(f) representing each phase spectrum adjustment as the sum of an adjustment associated with a receiver and an adjustment associated with a transmitter; and,
(g) adjusting phase spectra of any electromagnetic data signals in said controlled source electromagnetic survey by said receiver adjustment or by said transmitter adjustment.

10. The method of claim 9, wherein said representation is determined by a least-squares fit.

11. The method of claim 1, further comprising using phase adjustments (shifts) determined in step (e), or timing errors equivalent to said phase shifts, to compensate any data from the survey for phase errors, whether or not the data (i) were used to determine the phase adjustments, or (ii) correspond to a frequency used to determine the phase adjustments, or (iii) represent a vector electromagnetic field component or components used to determine the phase adjustments; or (iv) correspond to the scaled offset range used to determine the phase adjustments.

12. The method of claim 1, wherein said minimizing of phase differences in step (e) gives preference to small values of scaled offset excluding any phase values affected by receiver saturation.

13. The method of claim 1, wherein step (b) is performed by dividing time-domain electromagnetic data into specific time intervals, each time interval approximately corresponding to a specific value of R, and determining the frequency components for each time interval.

14. The method of claim 1, wherein step (b) is performed by determining a timing error as a phase shift for minimizing the differences between said phase spectra, the phase shift corresponding to said timing error.

15. The method of claim 1, wherein the differences in phases are minimized in the adjusting step over an offset range of 0.1 km to 10 km or a lesser range included therein.

16. An apparatus for compensating electromagnetic data signals recorded by a receiver in a controlled source electromagnetic survey for a phase error, the apparatus comprising:
(a) a receiver and a source; (b) a recorder for recording electromagnetic data signals at a plurality of source-receiver offsets, R; (c) a computer adapted to perform the steps of:
determining a plurality of temporal frequency components of the recorded data at each of said source-receiver offsets;
determining the phase spectra of each of said frequency components;
scaling the source-receiver offset R of said phase spectra for each frequency f by a scale factor proportional to $\sqrt{\omega}$, where $\omega=2\pi f$, and;
adjusting said phase spectra such that the differences in phases for said frequencies are minimized over at least a portion of the scaled offset range.

17. A method for producing hydrocarbons from a subsurface region, comprising:
(a) performing a controlled-source electromagnetic survey of the subsurface region;
(b) obtaining data from the controlled-source electromagnetic survey, said data having been compensated for phase errors by a method comprising:
(i) obtaining said electromagnetic data signals at a plurality of source-receiver offsets, R;
(ii) determining a plurality of temporal frequency components of the data at each of said source-receiver offsets;
(iii) determining the phase spectra of each of said frequency components;
(iv) scaling the source-receiver offset R of said phase spectra for each frequency f by a scale factor proportional to $\sqrt{\omega}$, where $\omega=2\pi f$, and;
(v) adjusting said phase spectra such that the differences in phases for said frequencies are minimized over at least a portion of the scaled offset range;
wherein one or more of steps (ii), (iii), (iv) and (v) are performed on a computer;
(c) drilling a well into a layer exhibiting in the compensated data a resistivity anomaly indicative of hydrocarbon presence; and
(d) producing hydrocarbons from the well.

\* \* \* \* \*

UNITED STATES PATENT AND TRADEMARK OFFICE
CERTIFICATE OF CORRECTION

PATENT NO. : 7,769,553 B2  Page 1 of 1
APPLICATION NO. : 12/087438
DATED : August 3, 2010
INVENTOR(S) : Dennis E. Willen It is certified that error appears in the above-identified patent and that said Letters Patent is hereby corrected as shown below:

In the Claims:

Col. 10, Claim 14, line 6, replace (b) with --(e)--.

Signed and Sealed this

Twelfth Day of October, 2010

David J. Kappos
*Director of the United States Patent and Trademark Office*